(12) United States Patent
Matsuo et al.

(10) Patent No.: US 6,748,757 B2
(45) Date of Patent: Jun. 15, 2004

(54) AIR CONDITIONER FOR AUTOMOBILE

(75) Inventors: Kazuya Matsuo, Tsukuba (JP); Kiyoshi Nagasawa, Oohira (JP); Toshihiko Fukushima, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/986,589

(22) Filed: Nov. 9, 2001

(65) Prior Publication Data
US 2003/0019232 A1 Jan. 30, 2003

(30) Foreign Application Priority Data
Jul. 24, 2001 (JP) ........................................ 2001-222603

(51) Int. Cl.[7] .................................................. B60H 1/32
(52) U.S. Cl. ......................................... 62/244; 180/68.2
(58) Field of Search ................... 62/244, 428; 236/35.2, 236/35.3; 180/65.1, 68.1, 68.2, 68.4

(56) References Cited

U.S. PATENT DOCUMENTS

| | | | | |
|---|---|---|---|---|
| 5,205,484 A | * | 4/1993 | Susa et al. ................... 236/35.3 |
| 5,341,652 A | * | 8/1994 | Tajiri et al. .................... 62/244 |
| 5,572,881 A | * | 11/1996 | Hotta et al. .................... 62/428 |
| 5,641,016 A | * | 6/1997 | Isaji et al. ..................... 165/43 |
| 5,678,760 A | * | 10/1997 | Muso et al. .................. 180/65.1 |
| 5,756,227 A | * | 5/1998 | Suzuki et al. .................. 429/62 |
| 5,834,132 A | * | 11/1998 | Hasegawa et al. ............. 429/62 |
| 5,971,290 A | * | 10/1999 | Echigoya et al. ...... 237/12.3 B |
| 5,992,156 A | * | 11/1999 | Isobe et al. .................... 62/244 |
| 6,027,032 A | * | 2/2000 | Aoki et al. ..................... 122/26 |
| 6,038,877 A | * | 3/2000 | Peiffer et al. .................. 62/244 |
| 6,352,102 B1 | * | 3/2002 | Takechi et al. .............. 165/203 |
| 6,357,541 B1 | * | 3/2002 | Matsuda et al. ............ 180/68.2 |
| 6,371,202 B1 | * | 4/2002 | Takano et al. ............... 165/202 |

FOREIGN PATENT DOCUMENTS

JP  4-368221  12/1992

* cited by examiner

Primary Examiner—William E. Tapolcai
Assistant Examiner—Mohammad M. Ali
(74) Attorney, Agent, or Firm—Antonelli, Terry, Stout & Kraus, LLP

(57) ABSTRACT

In an air conditioner for an automobile, restriction on arrangement of electric apparatus is removed, small-sized and light-weighted formation is achieved by promoting cooling capacity of the electric apparatus by a cooling fluid by an inexpensive constitution and firm defrosting is enabled by closing an air flow path of an exterior heat exchanger. For that purpose, there are provided a refrigeration cycle having an electrically driven compressor and an exterior heat exchanger and a radiator used in an electric automobile having a driving motor for driving the automobile and a motor driving power source for driving the driving motor and connected to cool a heat generating electric apparatus such as the driving motor or the motor driving power source via the cooling fluid, the radiator is arranged in the air flow path of exterior fan and an opening and closing apparatus for opening and closing the air flow path of the exterior heat exchanger is provided.

10 Claims, 6 Drawing Sheets

AIR CONDITIONER FOR AUTOMOBILE

BACKGROUND OF THE INVENTION

1. Field of the Invention

The present invention relates to an air conditioner for an automobile, particularly preferable for an air conditioner used in an electric automobile driven by a driving motor.

2. Description of Prior Art

Although a conventional air conditioner of an engine-driven automobile is generally driven by an engine, an air conditioner of an electric automobile including a hybrid automobile, is driven by electricity similar to an air conditioner for household use. Therefore, although according to the conventional engine-driven automobile, heating can be carried out by utilizing waste heat at a high temperature, according to the electric automobile, waste heat at a high temperature by the engine is not provided normally and therefore, it is necessary to carry out heating by a heat pump using a refrigeration cycle similar to an air conditioner for household use.

In such an air conditioner of an electric automobile, as disclosed in Japanese Patent Laid-Open No.368221/1992, there is provided a constitution having a heat pump heating and cooling apparatus constituted by a compressor, an exterior heat exchanger, an exterior fan, an expansion valve, an interior heat exchanger, an interior fan and a four-way switch valve, an axle driving motor, a first air flow path introducing air having passed through the driving motor, a second air flow path directly introducing outside air and an apparatus of switching or opening and closing the two air flow paths in order to enable effectively utilizing waste heat of the axle driving motor and enabling defrosting the exterior heat exchanger in a heating mode of the heat pump.

According to the conventional technology, in heating by the heat pump, the first air flow path is opened and the second air flow path is closed, thereby, the outside air is heated by the waste heat of the driving motor and reaches the exterior heat exchanger and therefore, the waste heat of the driving motor can be utilized for heating by the heat pump. Further, when frost is formed and developed at the exterior heat exchanger depending on conditions of temperature and humidity of the outside air in heating, the heating cannot be carried out and therefore, defrosting is carried out by guiding gas at a high temperature delivered from the compressor of the refrigeration cycle to the exterior heat exchanger to thereby heat the exterior heat exchanger in a state in which the first air flow path is also closed and air does not flow through the exterior heat exchanger.

According to the above-described conventional technology, the waste heat of the driving motor is utilized in heating by the heat pump by making the outside air flow through the exterior heat exchanger after passing through the surrounding area of the driving motor and therefore, the driving motor must be arranged on the upstream side of the exterior heat exchanger and arrangement of the driving motor in a motor chamber is restricted. When the driving motor is arranged at a side or a rear side of the exterior heat exchanger in order to improve the restriction, there poses a problem that a shape of a duct constituting the air flow path becomes complicated and expensive and a cooling wind amount can not be provided sufficiently.

Further, according to the conventional technology, heat exchange is carried out between an outer peripheral face of the driving motor and outside air and therefore, there poses a problem that the heat exchange efficiency is low and waste heat of the driving motor cannot be utilized sufficiently. When the outer peripheral face of the driving motor is provided with fins in order to increase the heat exchange amount between the driving motor and the outside air, there poses a problem that an outer diameter of the driving motor is increased and performance of containing the driving motor is deteriorated.

Further, according to the conventional technology, there is not a description with regard to a case in which in heating by the heat pump, when snow or rain falls, snow or rain reaches the exterior heat exchanger by air flow caused by travel motion of the automobile and frost formation on the exterior heat exchanger is accelerated or the frost is frozen and heating is hampered.

Further, according to the conventional technology, a consideration is given only to utilizing the waste heat of the motor for driving the automobile and there is not a description with regard to utilizing waste heat of an inverter constituting a motor driving power source along with the driving motor and promotion of cooling function of the both.

SUMMARY OF THE INVENTION

It is a first object of the invention to provide an air conditioner for an automobile removing restriction on arrangement of electric apparatus, capable of achieving small-sized and light-weighted formation by promoting cooling capacity of the electric apparatus by a cooling fluid cooled by a radiator by an inexpensive constitution of flowing air to the radiator by an exterior fan in heating operation and capable of definitely defrosting the exterior heat exchanger by closing an air flow path of the exterior heat exchanger in heating operation.

It is a second object of the invention to provide an air conditioner for an automobile removing restriction on arrangement of a driving motor and a motor driving power source and capable of achieving small-sized and light-weighted formation by promoting cooling capacity of the driving motor and the motor driving power source by a cooling fluid in heating operation.

It is a third object of the invention to provide an air conditioner for an automobile removing restriction on arrangement of electric apparatus, capable of achieving small-sized and light-weighted formation by promoting heating capacity by effectively utilizing waste heat in heating operation and promoting cooling capacity of the electric apparatus by a cooling fluid, capable of definitely defrosting an exterior heat exchanger by closing an air flow path of the exterior heat exchanger in heating operation and capable of promoting cooling function by flowing wind to a radiator and the exterior heat exchanger in parallel with each other in a cooling operation.

As first means of the invention in order to achieve the first object, there is provided an air conditioner for an automobile used for an electric automobile comprising a driving motor for driving the automobile and a motor driving power source for driving the driving motor, the air conditioner comprising, a refrigeration cycle formed by connecting an electrically driven compressor, an exterior heat exchanger, a pressure reducing apparatus, an interior heat exchanger and a four-way switch valve, an exterior fan for flowing outside air to the exterior heat exchanger, and an interior fan for flowing inside air to the interior heat exchanger, further comprising a radiator connected to cool a heat generating electric apparatus such as the driving motor or the motor driving power source via a cooling fluid, wherein the radiator is arranged on an upstream side of the exterior heat exchanger in an air flow path of the exterior fan and an opening and closing apparatus for opening and closing an air flow path of the exterior heat exchanger is provided.

According to second means of the invention for achieving the second object, the radiator connected to cool both of the driving motor and the motor driving power source via a cooling fluid is arranged in an air flow path by the fan.

According to third means of the invention in order to achieve the third object, in an air conditioner for an automobile, there is provided a radiator connected to cool a heat generating electric apparatus such as the driving motor or the motor driving power source via a cooling fluid, there are provided a first air flowing duct arranged with the exterior heat exchanger and a second air flowing duct arranged with the radiator and there is provided an opening and closing apparatus for opening and closing the first and the second air flowing paths such that air flows to the radiator and the exterior heat exchanger in this order in heating operation and the air flows to the radiator by closing an air flow path of the exterior heat exchanger in defrosting operation and the air flows to the radiator and the exterior heat exchanger in parallel with each other in a cooling operation.

DESCRIPTION OF PREFERRED EMBODIMENTS

Figure 1:
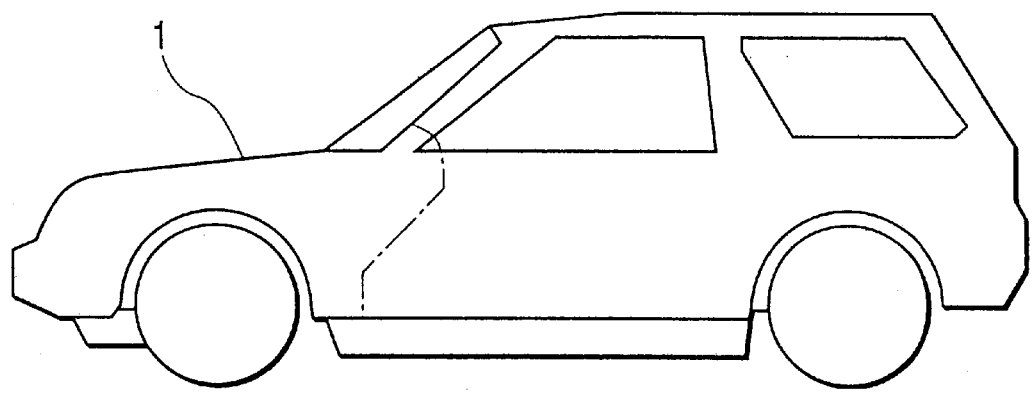
FIG. 1 is a side view of an automobile mounted with an air conditioner according to a first embodiment of the invention.

An explanation will be given of a plurality of embodiments of the invention in reference to the drawing as follows. Further, same notations in the drawings of the respective embodiments designate same portions or corresponding portions.

Figure 3:
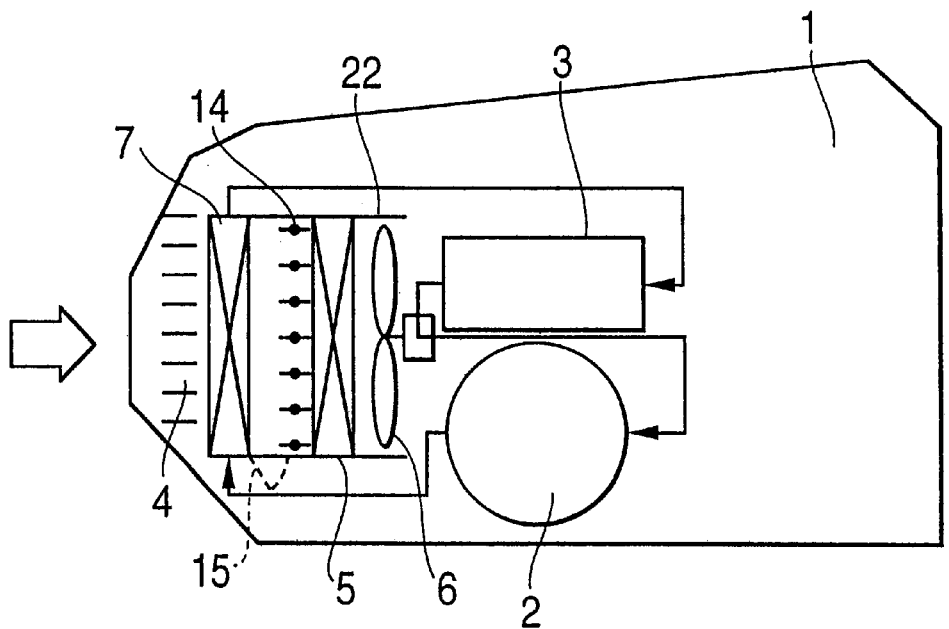
FIG. 3 is an outline plane sectional view of a motor chamber of the automobile.
Figure 4:
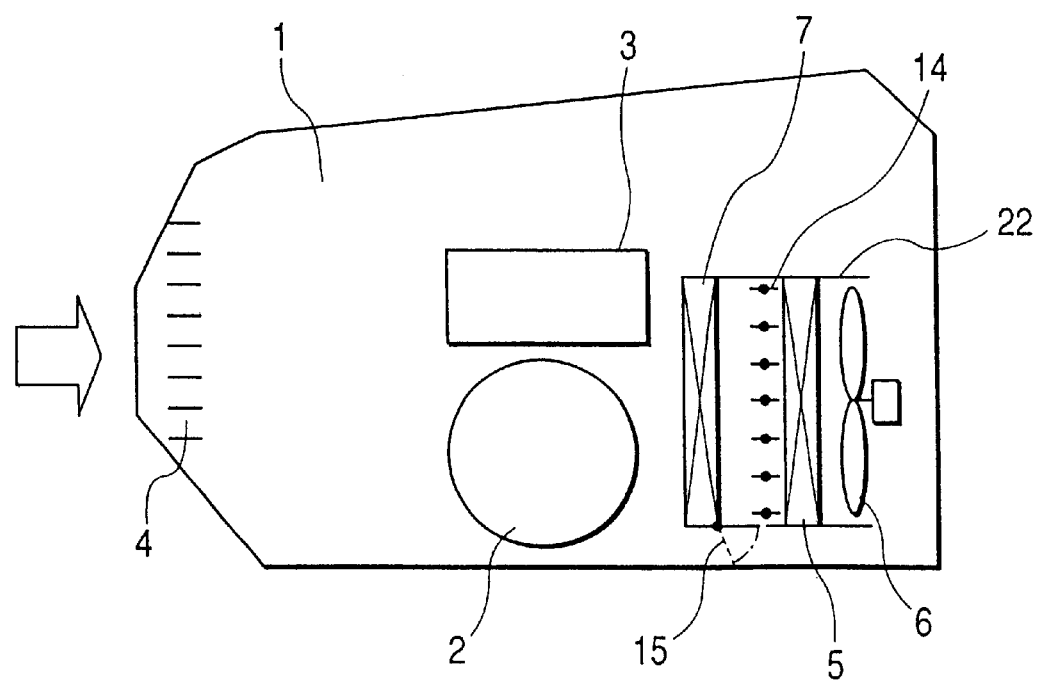
FIG. 4 is an outline plane sectional view of a modified example of the motor chamber.
Figure 5:
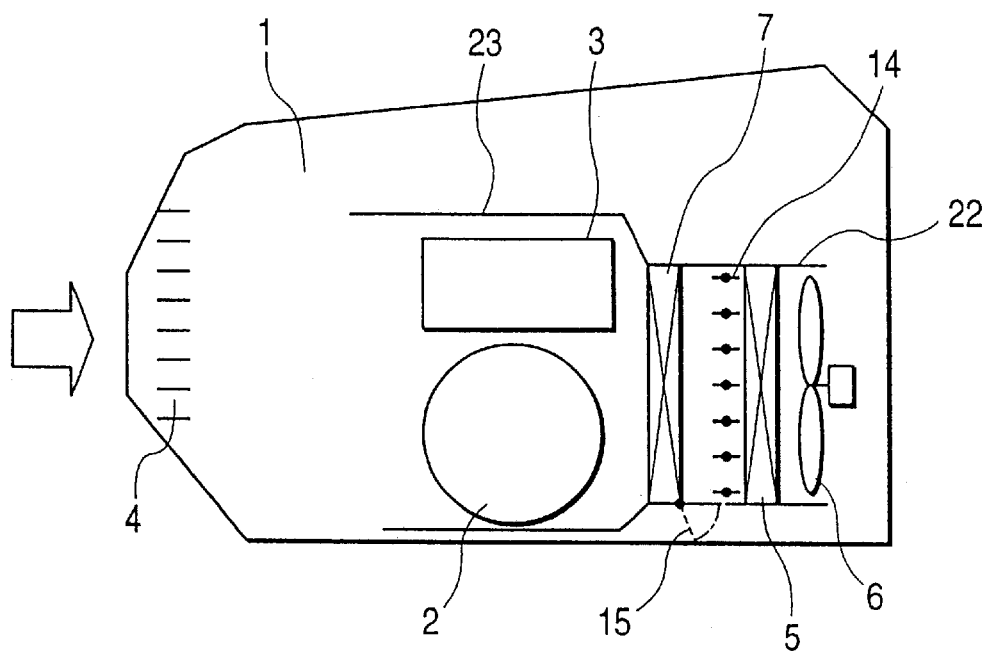
FIG. 5 is an outline plane sectional view of other modified example of the motor chamber.

First, an explanation will be given of a first embodiment in reference to FIG. 1 through FIG. 5. FIG. 1 is a side view of an automobile mounted with an air conditioner according to a first embodiment of the invention, FIG. 2 is a constitution diagram of a refrigeration cycle of the air conditioner, FIG. 3 is an outline plane sectional view of a motor chamber of the automobile, FIG. 4 is an outline plane sectional view of a modified example of the motor chamber and FIG. 5 is an outline plane sectional view of other modified example of the motor chamber.

The air conditioner of the embodiment is mounted in the automobile shown in FIG. 1. A motor chamber 1 contained with a driving motor 2 (refer to FIG. 3) is provided at a front portion of the automobile. According to the motor chamber 1, although not illustrated, an outside air intake port is provided at a front face and an exhaust port of intake outside air is provided at a bottom portion of a rear portion thereof. Thereby, outside air is mainly taken in from the front face into the motor chamber 1 and exhausted from the bottom face of the rear portion.

Figure 2:
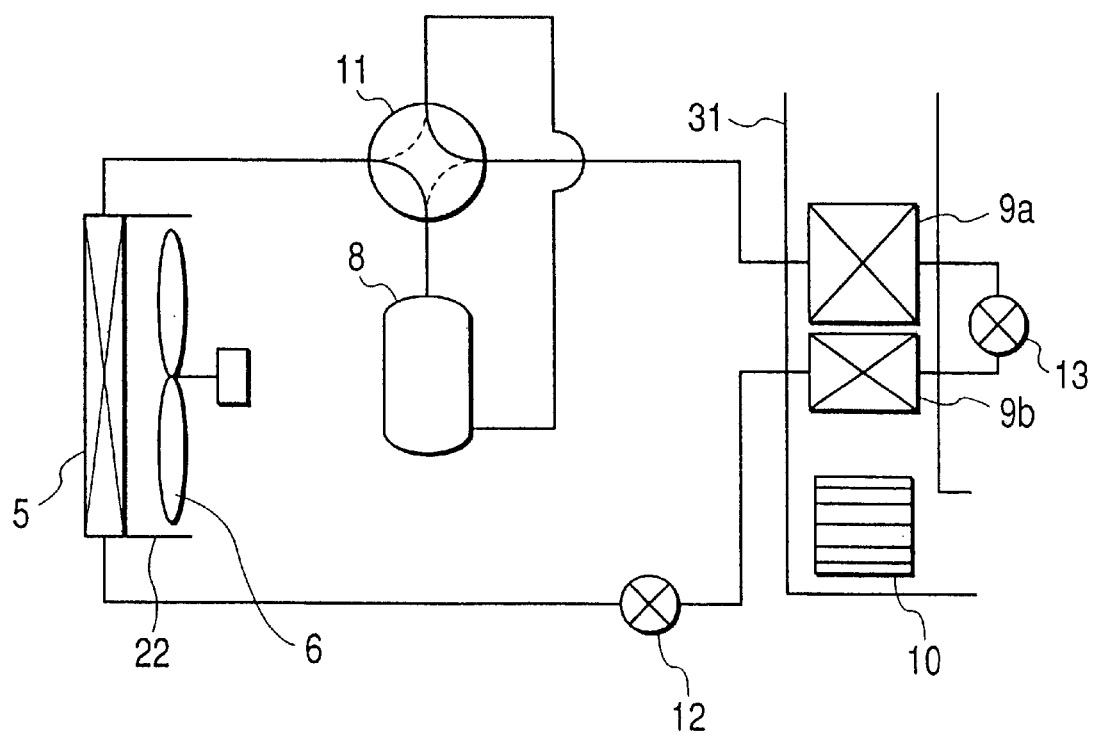
FIG. 2 is a constitution diagram of a refrigeration cycle of the air conditioner.

As shown by FIG. 2, a refrigeration cycle of the air conditioner according to the embodiment is connected by refrigerant pipes and constituted to form a circulation cycle of an electrically driven compressor 8, a four-way valve 11 constituting a changeover valve, an exterior heat exchanger 5, an expansion valve 12 constituting a pressure reducing apparatus, an interior heat exchanger 9b, a cycle dehumidifying throttle valve 13, an interior heat exchanger 9a, the four-way valve 11 and the electrically driven compressor 8. The electrically driven compressor 8 is driven by being supplied with power from a power source for automobile and is constituted by including a motor portion and a compressor mechanism portion in a vessel. The four-way valve 11 switches a refrigeration cycle to cooling cycle indicated by bold lines in FIG. 2 and a heating cycle indicated by broken lines. When the refrigeration cycle is switched to the cooling cycle, cooling operation can be carried out, and when the refrigeration cycle is switched to the heating cycle, a heat pump heating operation and a heating and dehumidifying operation can be carried out. Respective apparatus constituting the refrigeration cycle is arranged in the motor chamber 1 (in FIG. 3, other than the exterior heat exchanger 5 is omitted). The exterior heat exchanger 5 is arranged in a duct 22 and heat exchange is carried out by sending outside air with an exterior fan 6. The interior heat exchanger 9a and the interior heat exchanger 9b are arranged in a duct 31 and heat exchange is carried out by circulating the inside air in a car compartment in which a driver or the like rides in an order of the interior heat exchanger 9b and the interior heat exchanger 9a by an interior fan 10. Although these are arranged in the motor chamber 1, the duct 31 communicates with inside of the compartment of the automobile and inside air is circulated therein to thereby carry out the air conditioning in the car compartment.

An explanation will be given of operation in the heating operation. Refrigerant gas at a high temperature and a high pressure delivered from the electric ally driven compressor 8 passes through the four-way valve 11 switched as shown by the broken lines of FIG. 2, reaches the interior heat exchangers 9a and 9b and heats inside air flowed by the interior fan 10 to thereby heat inside of the compartment. The cycle dehumidifying throttle valve 13 provided at a middle of the interior heat exchangers 9a and 9b, is opened and pressure is not reduced. The refrigerant condensed and liquefied in the interior heat exchangers 9a and 9b reaches the expansion valve 12, subjected to pressure reduction and reaches the exterior heat exchanger 5. Here, the refrigerant evaporates to absorb heat from outside air sent by the exterior fan 6, passes through the four-way valve 11 in a direction of the broken line and is sucked into the electrically driven compressor 8. Further, the refrigerant is compressed by the electric ally driven compressor 8 and becomes a gas at a high temperature and a high pressure and delivered to thereby repeat the above-described operation.

When frost formation progresses on the exterior heat exchanger 5 in heating operation, defrosting operation becomes necessary. There are various defrosting operation methods in a refrigeration cycle of a stationary type air conditioner for household use and similar methods are adopted. For example, in the heating operation, when the interior fan 10 and the exterior fan 6 are stopped and the throttle valve 13 and the expansion valve 12 are opened, the gas at a high temperature delivered from the electrically driven compressor 8 does not radiate heat at the interior heat exchanger 9a and 9b, reaches the exterior heat exchanger 5 and heats the exterior heat exchanger 5, thereby, defrosting can be carried out by melting adhered frost.

When dehumidifying is needed for preventing fogging of window glasses in the heating operation, in the refrigeration cycle, the cycle dehumidifying throttle valve 13 is throttled while carrying out heating operation to thereby carry out the heating and dehumidifying operation. Thereby, inside air is cooled and dehumidified by the interior heat exchanger 9b and is heated by the interior heat exchanger 9b to thereby realize heating and dehumidifying. At this occasion, the expansion valve 12 is opened or controlled to a more or less throttled state.

In the cooling operation, the four-way valve 11 is switched as indicated by the bold lines and the refrigerant is flowed in a direction reverse to that in the heating operation to thereby cool inside air. At this occasion, the cycle dehumidifying throttle valve 13 is opened similar to that in the heating operation.

As a way of using the air conditioner, in accordance with geographical areas where the air conditioner is used, there are a way of mainly using heating, a way of mainly using cooling and a way of using both of cooling and heating substantially equivalently. For an electric automobile having a main object in protection of environment, a reduction in power is extremely problem and there is needed a method of reducing power consumption of the air conditioner in accordance with the way of use. As shown by FIG. 3, the embodiment is constructed by a constitution in correspondence with the way of mainly using heating.

Figure 3A:
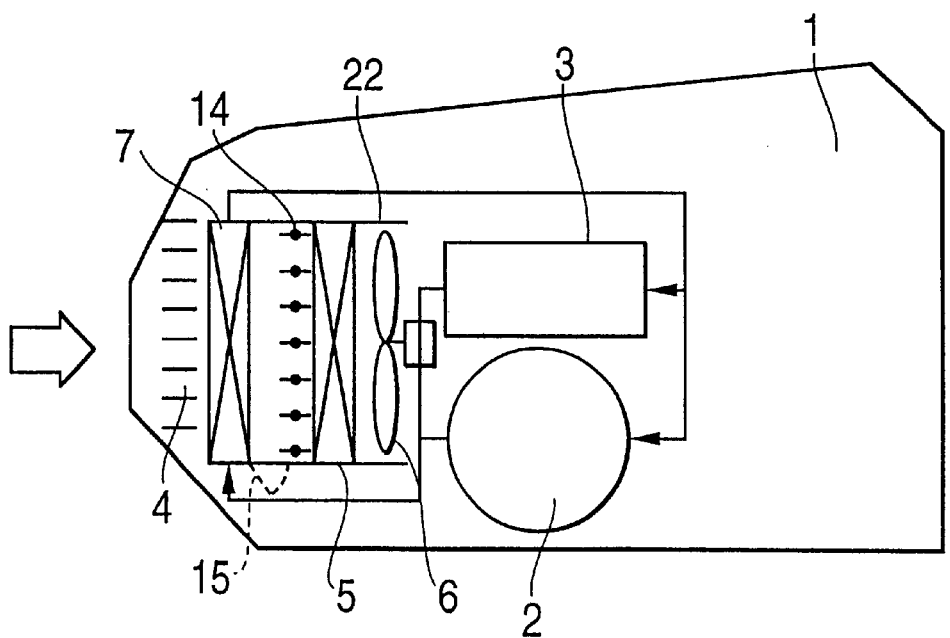
FIG. 3A shows a modification of the cooling fluid flow path shown in FIG. 3.

According to the embodiment, a pipe in which a cooling fluid such as brine or secondary refrigerant flows, is brought into contact with and cools surrounding or inside of electric apparatus generating heat such as apparatus of a driving motor 2, a motor driving power source 3 and the like, the heated cooling fluid is guided to a radiator 7 by a pump or the like, radiates heat to outside air and thereafter returned to the electric apparatus to thereby cool the electric apparatus. The motor driving power source 3 is constituted by an inverter or the like, particularly, a heat generating amount of a plurality of switching elements constituting the inverter is considerable and the elements need to be cooled definitely. It is preferable to make the cooling fluid flow to the electric apparatus in series, as shown in FIG. 3, in an order in accordance with priorities such as the heat generating amount and heat resistance of the apparatus, thereby, firm reliability of the electric apparatus can be achieved by an inexpensive constitution. Particularly, according to the motor driving power source 3, high density formation of electric parts and high capacity formation of output are progressed, the heat resistance is generally low and therefore, it is preferable to firstly cool the motor driving power source with the topmost priority. On the other hand, by making the cooling fluid flow to the electric apparatus in parallel, as shown in FIG. 3A, the respective electric apparatus can firmly be cooled on an average.

In the motor chamber 1, as shown by FIG. 3, there are arranged an outside air introducing grille 4, the radiator 7, a duct 22, a damper 15, a damper 14, the exterior heat exchanger 5 and the exterior fan 6 along with the driving motor 2 and the motor driving power source 3. The outside air introducing grille 4 is arranged at an air intake port formed at a front face of the motor chamber 1 to prevent foreign matters from invading into the motor chamber 1. The duct 22 is extended from the outside air introducing grille 4 constituting the air intake port to a rear side of inside of the motor chamber 1. Inside the duct 22, there are provided the radiator 7, the damper 14, the exterior heat exchanger 5 and the exterior fan 6 in this order. The radiator 7 is constituted by a cross fin type heat exchanger or a corrugated fin type heat exchanger and is arranged right on the rear side of the outside air introducing grille 4. The damper 14 is an opening and closing apparatus for opening and closing an inlet side air flow path of the exterior heat exchanger 5 and is provided between the heat radiating heat exchange 7 and the exterior heat exchanger 5 and right on the front side of the exterior heat exchanger 5. The damper 14 is divided into a plurality of sheets and each of the sheets is provided rotatably. Thereby, even when the damper 14 is rotated, it is not necessary to enlarge a dimension thereof in the front and rear direction and the dimension of the duct 22 in the front and rear direction can be reduced. This is useful for reducing the motor chamber 1 and containing a number of other apparatus or large-sized apparatus in the motor chamber 1. The damper 15 is provided to open and close the duct 22 at a middle portion of the radiator 7 and the damper 14 and can be opened to connect an downstream side of the radiator 7 to outside of the duct 22. The driving motor 2 and the motor driving power source 3 are installed right on the rear side of the duct 22.

In the above-described heating operation, in a state in which the damper 14 is opened and the damper 15 is closed, in the refrigeration cycle, the exterior fan 6 and the interior fan 10 are operated. Outside air is taken from the outside air introducing grille 4 into the duct 22 by vehicle speed and the exterior fan 6, cools the radiator 7 to thereby elevate temperature thereof, passes through the opened damper 14, exchanges heat with the exterior heat exchanger 5 to thereby lower temperature thereof and is exhausted from the rear portion of the duct 22 toward the driving motor 2 and the motor driving power source 3 in the motor chamber 1.

By the above-described constitution, waste heat of heat generating apparatus in the automobile is collected to the radiator 7, the radiator 7 is arranged on the upstream side of the exterior heat exchanger 5 and therefore, in the heat pump heating operation, outside air is heated by the radiator 7 and thereafter reaches the exterior heat exchanger 5. Thereby, almost all of the waste heat of the heat generating apparatus in the automobile can be recovered to utilize and therefore, heating capacity can be increased, efficiency of the heat pump operation can be promoted and considerable power saving effect can be achieved.

Further, since the radiator 7 is arranged in the duct 22, the radiator 7 is cooled by high speed air and therefore, heat radiation is expedited more than that in a conventional air cooling system of cooling the electric apparatus by the outside air. Thereby, the heat transfer area for cooling the apparatus can be reduced and the apparatus can be made small-sized and light-weighted. Further, there is achieved an effect of removing restriction on arrangement of the electric apparatus. Particularly, the radiator 7 is firstly cooled by outside air having a low temperature taken in from the outside air introducing grille 4 and therefore, heat radiation of the radiator 7 is expedited also in this respect.

In a heating operation or in a heating and dehumidifying operation, when frost is formed and developed on the exterior heat exchangers depending on conditions of temperature and humidity of outside air, the heating operation cannot be carried out and therefore, defrosting of the exterior heat exchanger 5 is carried out. In the defrosting operation, the damper 14 is closed, the exterior fan 6 is stopped and flow of air at a surrounding of the exterior heat exchanger 5 is stopped. In the refrigeration cycle, by making the refrigerant flow as in the above-described defrosting operation, the exterior heat exchanger 5 is heated. At this occasion, the damper 14 is closed and by stopping the exterior fans 6, flow of air at the surrounding of the exterior heat exchanger 5 is stopped and therefore, heat used in defrosting does not leak to outside and the defrosting is carried out firmly. When the damper 15 is opened in defrosting, in running the automobile, when the automobile is running, even in defrosting, outside air is enabled to flow to the radiator 7 and cooling of the heat generating apparatus can be carried out firmly.

When rain or snow falls in the heating operation, outside air entering from the outside air introducing grille 4, reaches the exterior heat exchanger 5 via the radiator 7 and therefore, the radiator 7 achieves an effect of a filter against rain or snow and surface temperature of the radiator 7 is higher than temperature of outside air and therefore, rain or snow is removed here and does not reach the exterior heat exchanger 5. Thereby, even under the weather condition of rainfall or snowfall, the heating operation is not hampered and firm heating effect can be achieved.

Meanwhile, also in cooling operation, in the state in which the damper 14 is opened and the damper 15 is closed, the refrigeration cycle, the exterior fan 6 and an interior fan 10 are operated. Therefore, contrary to the above-described heating operation, outside air heated by the radiator 7 is taken in the exterior heat exchanger 5 and therefore, there is a drawback of deteriorating the efficiency of cooling operation. However, in the case of a geographical area where a heating time period is long, promotion of efficiency of heating operation becomes dominant and therefore, even when the efficiency in cooling operation is lowered, a power consumption amount of the air conditioner throughout a year can be reduced.

Here, an explanation will be given of a modified example of the embodiment in reference to FIG. 4 and FIG. 5. According to the modified example shown in FIG. 4, the duct 22 arranged with the radiator 7, the damper 14, the exterior heat exchanger 5 and the exterior fan 6, is arranged at a rear portion of the motor chamber 1 and on rear sides of the driving motor 2 and the motor driving power source. Thereby, even under a weather condition of rainfall or snowfall, the duct 22 is install remotely from the outside air introducing grille 4 at a distance and by constituting a barrier with the driving motor 2 and the by motor driving power source 3, all the more, there is not a concern that rain or snow reaches the exterior heat exchanger 5, the heating operation is not hampered and the heating operation can firmly be carried out.

Further, the duct 22 may be arranged at a lower portion or an upper portion or in a trunk room of an automobile provided with an introducing port and an exhaust port of outside air.

Further, according to other modified example shown in FIG. 5, a duct 23 is provided to cover electric apparatus such as the driving motor 2 and the inverter 3 and the duct 23 is connected to the duct 22. Thereby, all the more, waste heat of the electric apparatus can be recovered to utilize.

Figure 6:
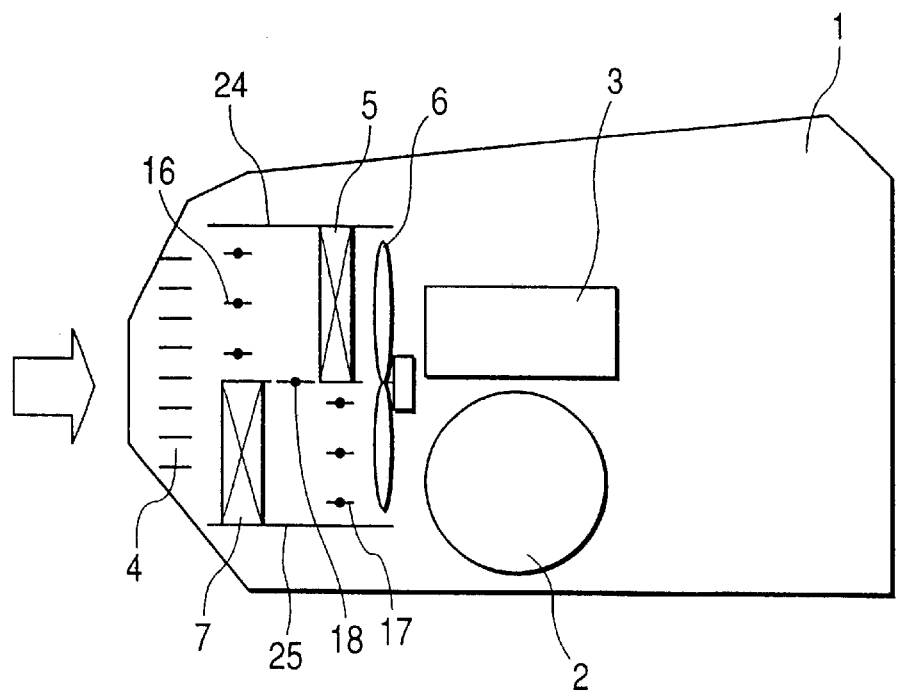
FIG. 6 is an outline plane sectional view of a motor chamber of an automobile mounted with an air conditioner according to a second embodiment of the invention.
Figure 7:
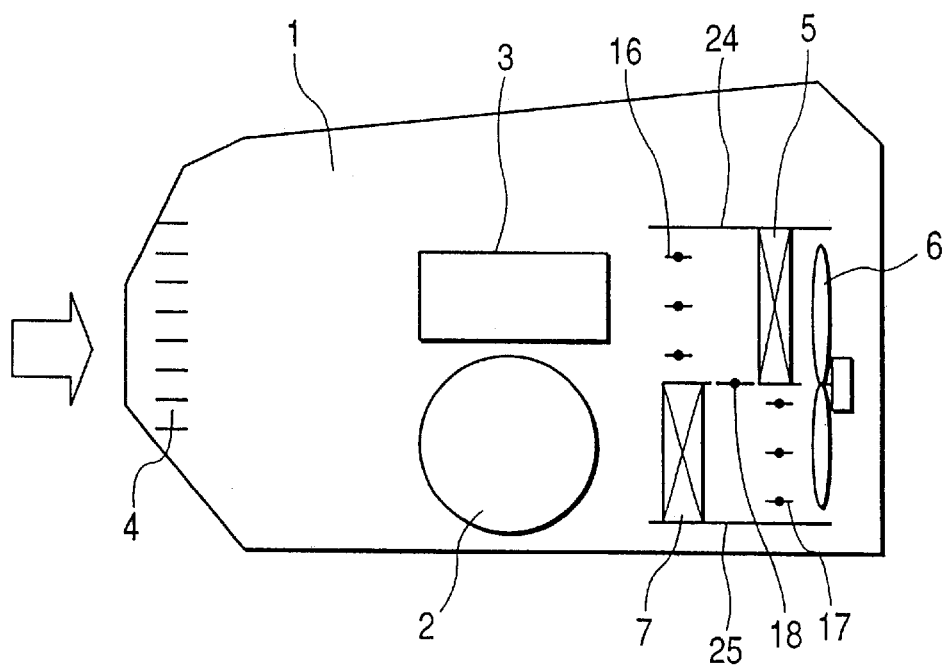
FIG. 7 is an outline plane sectional view of a modified example of the motor chamber.

Next, an explanation will be given of a second embodiment of the invention in reference to FIG. 6 and FIG. 7. FIG. 6 is an outline plane sectional view of a motor chamber of an automobile mounted with an air conditioner according to a second embodiment of the invention and FIG. 7 is an outline plane sectional view of a modified example of the motor chamber. The second embodiment differs from the first embodiment as described below and other point thereof is basically the same as that of the first embodiment. Further, the second embodiment is suitable for a case in which cooling and heating are needed substantially equivalently.

As shown by FIG. 6, a damper 16 and the exterior heat exchanger 5 are arranged in the first duct 24 and the radiator 7 and a damper 17 are arranged in a second duct 25. The two ducts 24 and 25 are contiguously provided in parallel with each other, inlet sides thereof connect to the outside air introducing grille 4 and the two ducts are provided to extend from the outside air introducing grille 4 to a rear side in the motor chamber 1. The damper 16 is provided to open and close an air flow path on the inlet side of wind blowing of the exterior heat exchanger 5 and is constituted by a plurality of sheets. A damper 17 is provided to open and close an air flow path on an outlet side of the radiator 7 and is constituted by a plurality of sheets. A path (inlet side path of the exterior heat exchanger 5) at a middle portion of the damper 16 and the exterior heat exchanger 5 and a path (outlet side path of the radiator 7) at a middle portion of the radiator 7 and the damper 17, are connected via an openable and closable damper 18. The exterior fan 6 is installed at a common air flow path on rear sides of the two ducts 24 and 25. In this way, the single exterior fan 6 is used as a fan common to the exterior heat exchanger 5 and the radiator 7 and therefore, the second embodiment can be made inexpensive. Further, the exterior fans 6 may be installed respectively for the ducts 24 and 24 independently from each other, in that case, although an increase in the cost results, wind blowing of the respective ducts can be controlled by the respective fans.

In heating operation, the dampers 16 and 17 are closed and the damper 18 is opened. Thereby, outside air is inhale to the duct 25, heated by the radiator 7 and thereafter guided to the duct 24 via the damper 18 and introduced into the exterior heat exchanger 5. Thereby, waste heat of the electric apparatus can effectively be recovered to utilize and an effect the same as that of the above-described first embodiment is achieved.

Further, when rain or snow falls, outside air reaches the exterior heat exchanger 5 via the radiator 7 and therefore, rain or snow precipitates here and does not reach the exterior heat exchanger 5. Thereby, an effect the same as that of the above-described first embodiment is achieved.

In defrosting of heating operation, the damper 16 and the damper 18 are closed, the damper 17 is opened and the exterior fan 6 is stopped. Thereby, flow of air at the surrounding of the exterior heat exchanger 5 is stopped and accordingly, heat used for defrosting does not leak to outside and defrosting is carried out firmly. Further, since the damper 17 is opened, air flow of the radiator 7 can be ensured even in defrosting.

In cooling operation, the damper 16 and the damper 17 are opened and the damper 18 is closed. Thereby, outside air is directly introduced to the respective heat exchangers 5 and 7 and therefore, the respective heat exchangers 5 and 7 are cooled by air at the lowest temperature. Thereby, cooling of the electric apparatus is also carried out effectively, further, the efficiency of cooling operation of the air conditioner can be promoted more than that of the first embodiment.

Here, an explanation will be given of a modified example of the second embodiment in reference to FIG. 7. According to the modified example shown in FIG. 7, the ducts 24 and 25 arranged with the radiator 7, the dampers 16 through 18, the exterior heat exchanger 5 and the heat exterior fan 6, are arranged at a rear portion of the motor chamber 1 and on rear sides of the driving motor 2 and the motor driving power source 3. Thereby, there is achieved an effect similar to that of the modified example of the first embodiment shown in FIG. 4. Further, the ducts 24 and 25 may be arranged at a lower portion or an upper portion or a trunk room of an automobile capable of providing an introducing port and an exhaust port of outside air.

Figure 8:
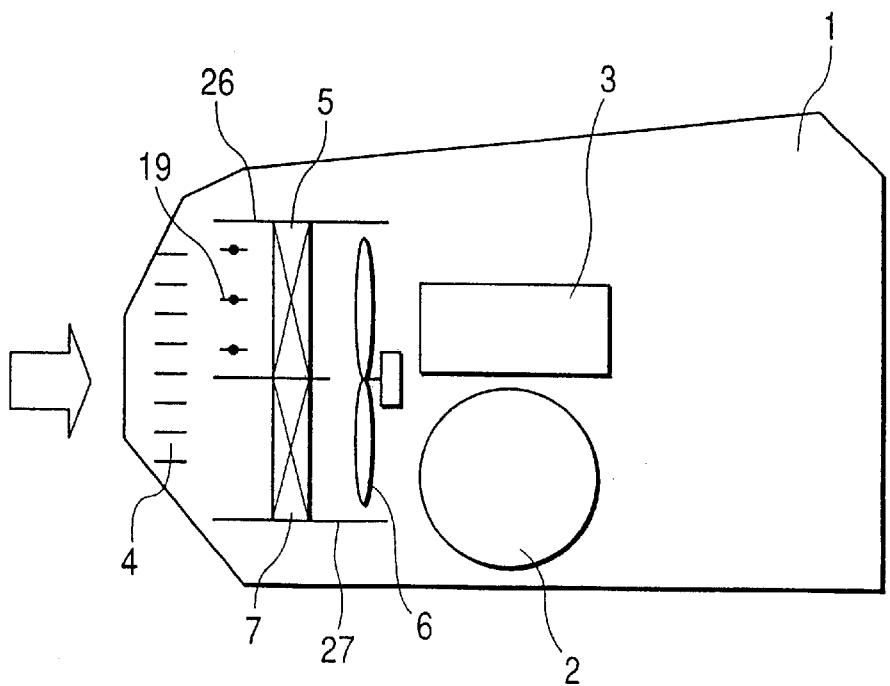
FIG. 8 is an outline plane sectional view of a motor chamber of an automobile mounted with an air conditioner according to a third embodiment of the invention.
Figure 9:
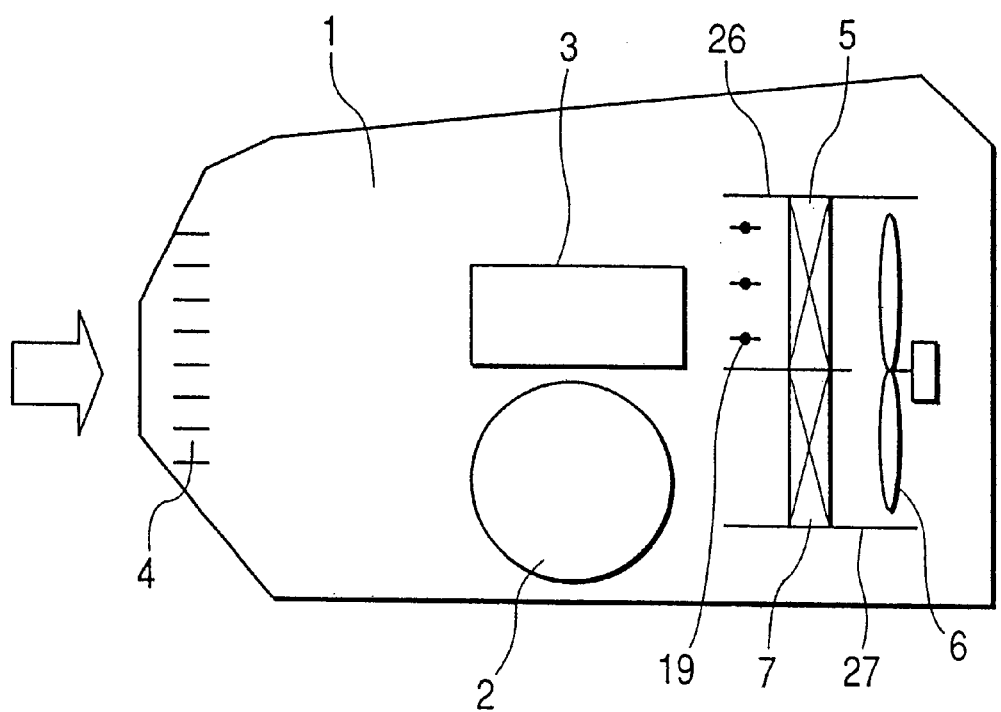
FIG. 9 is an outline plane sectional view of a modified example of the motor chamber.

Next, an explanation will be given of a third embodiment of the invention in reference to FIG. 8 and FIG. 9. FIG. 8 is an outline plane sectional view of a motor chamber of an automobile mounted with an air conditioner according to a third embodiment of the invention and FIG. 9 is an outline plane sectional view of a modified example of the motor chamber. The third embodiment differs from the first embodiment as described below and other point thereof is basically the same as that of the first embodiment. Further, the third embodiment is suitable for a geographical area mainly for cooling.

As shown by FIG. 8, a damper 19 and the exterior heat exchanger 5 are arranged in a first duct 26 and the radiator 7 is arranged in a second duct 27. The exterior fan 6 is arranged in a common duct at rear portions of the two ducts 26 and 27. Further, the fans may be installed respectively for the ducts 26 and 27, further, the fans may be arranged not at the rear portions of the ducts as shown by FIG. 8 but front portions or middle portions thereof.

In cooling operation, the duct 19 is opened, outside air is directly introduced to the respective heat exchangers 5 and 7 and therefore, the respective heat exchangers 5 and 7 are cooled by air at the lowest temperature. Thereby, cooling of the electric apparatus can be carried out effectively and efficiency of cooling operation of the air conditioner can be promoted more than that of the first embodiment.

In heating operation, the damper 19 is opened and outside air is directly taken into the exterior heat exchanger 5. According to the constitution, waste heat of electric apparatus cannot be recovered to utilize and therefore, there is a drawback that the heating capacity cannot be promoted and efficiency of heating operation cannot be promoted more than those of the first embodiment. However, in the case of a geographical area where a cooling time period is long, promotion of efficiency of cooling operation becomes dominant and therefore, even when the efficiency in heating operation is lowered, a power consumption amount of the air conditioner throughout a year can be reduced.

In defrosting of heating operation, the damper 19 is closed and the exterior fan 6 is stopped. Thereby, flow of air at surrounding of the exterior heat exchanger 5 is stopped and therefore, heat used for defrosting is not leaked to outside and defrosting can be carried out firmly. Even when the exterior fan 6 is stopped in defrosting, heat radiation of the radiator 7 can be ensured by wind caused by traveling motion.

Here, an explanation will be given of a modified example of the third embodiment in reference to FIG. 9. According to the modified example shown in FIG. 9, the ducts 26 and 27 arranged with the damper 19, the exterior heat exchanger 5, the radiator 7 and the exterior fan 6, are arranged at a rear portion of the motor chamber 1 and on rear sides of the driving motor 2 and the motor driving power source 3. When rain or snow falls in heating operation, according to the embodiment shown in FIG. 8, rain or snow reaches the exterior heat exchanger 5 and attachment of frost or attachment of ice is caused and therefore, the above-described defrosting operation is needed frequently to ensure the heating capacity. When the exterior heat exchanger 5 is arranged on the rear side of the motor chamber 1 as shown by the modified example, outside air reaches the outside air heat exchanger 5 at a constant distance from the intake port 4 and therefore, during the time period, rain or snow precipitates and does not reach the exterior heat exchanger 5. Thereby, even under a weather condition of rainfall or snowfall, the heating operation is not hampered and a firm heating effect can be achieved. Further, the ducts 26 and 27 may be arranged at a lower portion or an upper portion or a trunk room of an automobile capable of providing an introducing port and an exhaust port of outside air.

In the above-described respective embodiments, a fuel cell may be used as a power source for an automobile. An air path blocking apparatus may be not only of the damper but also of a shutter type or pivoting type. A method of driving the damper may be of an electric type such as a motor or a magnet or a system using air pressure or liquid pressure or may be of manual operation.

Further, although according to the above-described respective embodiments, the explanation has been given of an example of the electric automobile in which the automobile is driven only by a driving motor, the invention is applicable also to a hybrid electric automobile using both of a gasoline engine or the like and a driving motor for driving the automobile.

The air conditioner for automobile of the present invention is capable of removing restriction on arrangement of electric apparatus, capable of achieving small-sized and light-weighted formation by promoting cooling capacity of the electric apparatus by a cooling fluid cooled by a radiator by an inexpensive constitution of flowing air to the radiator by an exterior fan in heating operation and capable of definitely defrosting the exterior heat exchanger by closing an air flow path of the exterior heat exchanger in heating operation.

Further, the air conditioner for automobile of the present invention is capable of removing restriction on arrangement of a driving motor and a motor driving power source and capable of achieving small-sized and light-weighted formation by promoting cooling capacity of the driving motor and the motor driving power source by a cooling fluid in heating operation.

Further, the air conditioner for automobile of the present invention is capable of removing restriction on arrangement of electric apparatus, capable of achieving small-sized and light-weighted formation by promoting heating capacity by effectively utilizing waste heat in heating operation and promoting cooling capacity of the electric apparatus by a cooling fluid, capable of definitely defrosting an exterior heat exchanger by closing an air flow path of the exterior heat exchanger in heating operation and capable of promoting cooling function by flowing wind to a radiator and the exterior heat exchanger in parallel with each other in a cooling operation.

What is claimed is:

1. An air conditioner for an automobile which is an air conditioner for an automobile used for an electric automobile comprising a driving motor for driving the automobile and a motor driving power source for driving the driving motor, said air conditioner comprising;

a refrigeration cycle formed by connecting an electrically driven compressor, an exterior heat exchanger, a pressure reducing apparatus, an interior heat exchanger and a four-way switch valve;

an exterior fan for sending outside air to the exterior heat exchanger; and an interior fan for sending inside air to the interior heat exchanger, further comprising:

a radiator connected to cool a heat generating electric apparatus such as the driving motor or the motor driving power source via cooling fluid;

wherein an opening is provided on an upstream side of the exterior heat exchanger, between the radiator and the exterior heat exchanger, in an air flow path of the exterior fan and closing apparatus for opening and closing an air flow path of the exterior heat exchanger is provided between the radiator and the exterior heat exchanger.

2. The air conditioner for an automobile according to claim 1, wherein the opening and closing apparatus is arranged on an air inlet side of the exterior heat exchanger.

3. An air conditioner for an automobile which is an air conditioner for an automobile used for an electric automobile comprising a driving motor for driving the automobile and a motor driving power source for driving the driving motor, said air conditioner comprising;

a refrigeration cycle formed by connecting an electrically driven compressor, an exterior heat exchanger, a pressure reducing apparatus, an interior heat exchanger and a four-way switch valve;

an exterior fan for sending outside air to the exterior heat exchanger; and an interior fan for sending inside air to the interior heat exchanger, further comprising:

a radiator connected to cool a heat generating electric apparatus such as the driving motor or the motor driving power source via a cooling fluid;

wherein the radiator, exterior heat exchanger and the exterior fan are arranged in this order in an air flow duct and an opening and closing apparatus for opening and closing an air flow path on an air inlet side of the exterior heat exchanger is provided between the radiator and the exterior heat exchanger.

4. The air conditioner for an automobile which is an air conditioner for an automobile used for an electric automobile comprising a driving motor for driving the automobile and a motor driving power source for driving the driving motor, said air conditioner comprising;

a refrigeration cycle formed by connecting an electrically driven compressor, an exterior heat exchanger, a pressure reducing apparatus, an interior heat exchanger and a four-way switch valve;

an exterior fan for sending outside air to the exterior heat exchanger; and an interior fan for sending inside air to the interior heat exchanger, further comprising:

a radiator connected to cool a heat generating electric apparatus such as the driving motor or the motor driving power source via a cooling fluid;

wherein the radiator, exterior heat exchanger and the exterior fan are arranged in this order in an air flow duct and an opening and closing apparatus for opening and closing an air flow path on an air inlet side of the exterior heat exchanger is provided, wherein the opening and closing apparatus opens and closes an air flow path between the radiator and the exterior heat exchanger and when the air flow path on the air inlet side of the exterior heat exchanger is closed, an air flow path on an air outlet side of the radiator is opened to outside of the air flow path.

5. The air conditioner for an automobile according to claim 4, wherein the opening and closing apparatus for closing the air flow path on the air inlet side of the exterior heat exchanger and the opening and closing apparatus for opening the air flow path on the air outlet side of the radiator to outside of the air flow path are provided independently from each other and the opening and closing apparatus for closing the air flow path on the air inlet side of the exterior heat exchanger is constituted by a plurality of portions thereof.

6. An air conditioner for an automobile which is an air conditioner for an automobile used for an electric automobile comprising a driving motor for driving the automobile and a motor driving power source for driving the driving motor, said air conditioner comprising;

a refrigeration cycle formed by connecting an electrically driven compressor, an exterior heat exchanger, a pressure reducing apparatus, an interior heat exchanger and a four-way switch valve;

an exterior fan for sending outside air to the exterior heat exchanger; and an interior fan for sending inside air to the interior heat exchanger, further comprising:

a radiator connected to cool a heat generating electric apparatus such as the driving motor or the motor driving power source via a cooling fluid, further comprising:

an air flow duct extended from an outside air intake port of a motor chamber arranged with the driving motor to a rear side in the motor chamber;

wherein the radiator, the exterior heat exchanger and the exterior fan are arranged in this order and an opening and closing apparatus for opening and closing an air flow path between the radiator and the exterior heat exchanger is provided in the air flow duct between the radiator and the exterior heat exchanger.

7. The air conditioner for an automobile according to claim 6, wherein the heat generating electric apparatus such as the driving motor or the motor driving power source, is arranged at a space on an air outlet side of the exterior fan.

8. The air conditioner for an automobile according to claim 7, wherein the driving motor and the motor driving power source are arranged in parallel with each other such that outside air flows in the space on the air outlet side of the exterior fan.

9. An air conditioner for an automobile which is an air conditioner for an automobile used for an electric automobile comprising a driving motor for driving the automobile and a motor driving power source for driving the driving motor, said air conditioner comprising;

a refrigeration cycle formed by connecting an electrically driven compressor, an exterior heat exchanger, a pressure reducing apparatus, an interior heat exchanger and a four-way switch valve;

an exterior fan for sending outside air to the exterior heat exchanger; and an interior fan for sending inside air to the interior heat exchanger;

wherein a radiator connected to cool both of the driving motor and the motor driving power source via a cooling fluid, is arranged in an air flow path created by the exterior fan, wherein said radiator and said exterior heat exchanger are arranged in order between an air flow inlet of said automobile and said exterior fan, further comprising a closing apparatus located between said radiator and said exterior heat exchanger for opening and closing said air flow path between said radiator and said exterior heat exchanger.

10. An air conditioner for an automobile which is an air conditioner for an automobile used for an electric automobile comprising a driving motor for driving the automobile and a motor driving power source for driving the driving motor, said air conditioner comprising;

a refrigeration cycle formed by connecting an electrically driven compressor, an exterior heat exchanger, a pressure reducing apparatus, an interior heat exchanger and a four-way switch valve;

an exterior fan for sending outside air to the exterior heat exchanger;

an interior fan for sending inside air to the interior heat exchanger; and radiator means connected for cooling at least one of the driving motor and the motor driving power source via a cooling fluid, said radiator means being arranged in an air flow path created by the exterior fan wherein said radiator means and said exterior heat exchanger are arranged in order between an air flow inlet of said automobile and said exterior fan, further comprising means for closing the air flow path between said radiator means and said exterior heat exchanger, wherein said closing means is located between said radiator and said exterior heat exchanger.

* * * * *